Jan. 28, 1964 W. H. HANNAHS 3,119,713
VAPOR PLATING COPPER
Filed Jan. 7, 1959
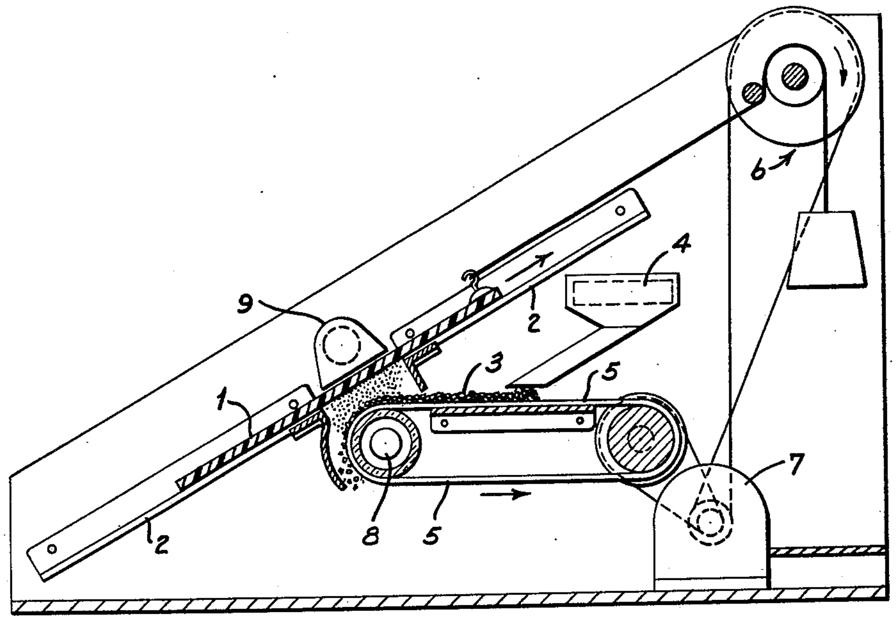
INVENTOR.
WILSON H. HANNAHS
BY
Morgan, Finnegan, Durham & Pine
ATTORNEYS.

3,119,713
Patented Jan. 28, 1964

3,119,713

VAPOR PLATING COPPER

Wilson H. Hannahs, Pleasantville, N.Y.
(% Photocircuits Corporation, Glen Cove, N.Y.)

Filed Jan. 7, 1959, Ser. No. 785,499
7 Claims. (Cl. 117—107.1)

The present invention relates to a method and apparatus by which a coating or film of copper is applied to a receptive surface. More particularly this invention relates to a process and apparatus in which a copper containing composition is caused to yield a vapor which will deposit a film or layer of copper upon the receptive surface.

Copper plating with vaporized copper has been carried out in different ways. One conventional method for depositing copper on a given surface is to pull a high vacuum in the region surrounding the material to be coated or plated and causing copper compounds to vaporize, simultaneously causing the surface to be heated which breaks down the vaporized compound and deposits a layer of metallic copper on said surface thereby.

The present invention differs from vacuum plating in that there is no necessity to have a vacuum in order to successfully operate the invention.

It is an object of this invention to provide a method which may be carried out simply and with a minimum of apparatus.

It is a further object of the present invention to provide an apparatus for the plating of an object with copper which may be so simple and compact that it is, for practical purposes, portable.

Another object of the present invention is to provide a method for the rapid deposition of a layer of copper on a base by which the layer is securely bound to its base.

A further object of the invention is to provide a method for depositing a layer of copper on a base which may be carried out as a continuous method.

Another object of this invention is to provide a method for the deposition of a layer of copper which is operative in a temperature range which makes possible the use of common organic polymer materials as bases.

Further objects and advantages of the invention will be set forth in part hereinafter and in part will be obvious herefrom, or may be learned by practice with the invention, the same being realized and attained by means of the instrumentalities and combinations pointed out in the appended claims.

The accompanying drawing, referred to herein and constituting a part hereof, illustrates an embodiment of the invention, and together with the description, serves to explain the principles of the invention.

The copper plating produced by the present invention develops a higher degree of adhesion of metal film to the substrate than can ordinarily be obtained by chemical electroless deposition or plating over a surface made conductive by the spraying of conductive layers thereon.

The preferred formate slurry composition is made up, by weight, of about 53% copper formate, 34% formic acid (37%) and 13% copper turnings. This formate slurry may be prepared by immersing copper turnings to about ¾ of their depth in formic acid and allowing these materials to react at room temperature for several days.

More generally, copper turnings are allowed to remain in a bath of strong formic acid for several days and are preferably kept covered and substantially immersed in the strong formic acid. If a weak solution of formic acid is used, a longer preparation time may be required, while the time may be shortened by using finer copper turnings or by using a more concentrated acid.

The surface which is to be plated by the present method and with the apparatus of the present invention is introduced at a point above said composition, which will be hereinafter referred to as the formate slurry, until a temperature of from 240° to 280° C. is reached. In this temperature range a slow exothermic reaction begins in the slurry, and large volumes of vapor are expelled from the composition. The surface to be plated is positioned in the path of these vapors and when said surface is heated to about 270° C. metallic copper is deposited thereon. The steps are so simple that a plastic cover capable of withstanding the temperature required for the deposit of metallic copper may be placed of a vessel containing the formate slurry, the slurry heated and heat simultaneously applied to the plastic cover, upon evolution of vapor a film of copper is deposited on the heated surface where it is contacted with said vapor.

It has been found desirable to carry out the above described process in a continuous manner and with very simple apparatus. Raw formate mix is supplied on a glass cloth belt, or belt or other material, resistant to the corrosive action of the formate slurry to a point beneath the object to be plated, a source of heat, such as a quartz tube containing a Nichrome heater, is positioned below the belt conveying the formate slurry. Upon being activated, heat from the heat source causes the evolution of vapors which vapors rise and come in contact with the metal or material to be plated. At a point above the material to be plated or below it but preceding the point of vapor contact is situated a second heat source such as a quartz tube containing a Nichrome heater which provides heat to the object to be plated which results in the decomposition of the vapor and decomposition of metallic copper. The two heaters are placed approximately one above the other with only the material to be plated and the formate slurry between them. The material to be plated can be advanced through the plating area in various conventional ways one of which is merely by attaching a set of teeth or grasping edges to one end of the work and attaching a motor driven puller or the like to advance said work.

The source of the heat of decomposition may alternatively be disposed below the work if placed at a point prior to that at which the copper containing compound is vaporized.

The work may be advanced by other means although the single drive means with its corresponding coordination of the feed of the copper containing compounds with the speed of the advance of the base to be plated is preferred.

The final products resulting from this invention are produced without having to resort to a vacuum. Depending upon the size and efficiency of the heat sources and the amount of formate slurry heated at any given time large areas of copper plating having a high factor of adhesion can be produced. The steps may be repeated on the same piece of work so that several layers may be so deposited. The process may be a batch or a continuous one depending upon the desires of the operator, as distinguished from the prior art. The composition of the formate slurry is not critical as to the purity of the ingredients used therein. It is equally effective when used with many crude materials. The invention operates in temperature ranges which permit the plating of copper to a wide variety of plastic and organic substrates.

The single figure of the drawing shows schematically a preferred embodiment of the apparatus used in carrying out the methods of this invention.

A more detailed description of this apparatus now follows:

A base 1 upon which a film of copper will be deposited is positioned in a guide means 2 which permits at least a portion of base to pass close to a source of copper vapors. A copper formate slurry 3 from a source 4 is deposited onto a continuous glass cloth belt 5. The continuous glass cloth belt 5 advances the formate slurry 3 to a position proximate to the underside of base 1 at a rate relative to the advance of base 1. This is accomplished by driving both the continuous glass cloth belt 5 and the work advancing means 6 from the same motor 7. Disposed beneath belt 5 is a source of heat 8 consisting of a Nichrome resistance in a quartz tube having a small inside diameter. This heat source vaporizes or sublimes the copper compounds 3 carried to it on belt 5. The rising vapor upon contact with the base 1 decomposes when the surfaces of the base is heated to the proper temperature. Heat of decomposition is supplied to this surface by a second heat source 9 consisting of a Nichrome resistance in a quartz tube having a small inside diameter and preferably disposed above the work.

The invention in its broader aspects is not limited to the specific steps, methods and compositions described, but departure may be made therefrom within the scope of the accompanying claims without departing from the principles of the invention and without sacrificing its chief advantages.

What is claimed is:

1. A method for the vapor plating of copper which comprises establishing a slurry of copper in a solution comprising formic acid and copper formate, heating the slurry to a temperature such that a slow, self-sustaining exothermic reaction occurs in the slurry to evolve vapors of copper compounds, contacting the vapors with a receptive surface heated to a temperature at which the vapors decompose, and then cooling the surface.

2. The method of claim 1 wherein the slurry is heated to a temperature above about 240° C. to initiate the exothermic reaction, and wherein the surface of the receptive material upon contact with the vapors is at a temperature of about 270° C.

3. The method of claim 1 wherein the slurry comprises, by weight, about 53% copper formate, about 34% of a 37% formic acid solution, and 13% copper turnings.

4. The method of claim 1 wherein the slurry is continuously moved to a source of heat to initiate the exothermic reaction in the slurry, and the heated receptive surface is continuously moved into contact with the evolved vapors.

5. The method of claim 4 wherein the movement of the slurry and the receptive surface are synchronized to control the coat weight.

6. An apparatus for vapor plating copper which comprises a supply means containing a slurry of copper in a solution of copper formate and formic acid, a slurry heating means, conveying means for transporting the slurry from the slurry supply means to the slurry heating means, a source of receptive material to be treated, separate receptive material heating means, separate receptive material conveying means for transporting the receptive material from the source to the receptive material heating means, said heating means and conveying means being so arranged that vapors produced at the slurry heating means contact heated portions of the receptive material.

7. The apparatus of claim 6 wherein the slurry conveying means and receptive material conveying means are synchronized to control the coat weight.

References Cited in the file of this patent

UNITED STATES PATENTS

| | | |
|---|---|---|
| 2,430,520 | Marboe | Nov. 11, 1947 |
| 2,545,576 | Godley | Mar. 20, 1951 |
| 2,704,727 | Pawlyk | Mar. 22, 1955 |
| 2,785,082 | Clough et al. | Mar. 12, 1957 |
| 2,785,651 | Pawlyk | Mar. 19, 1957 |
| 2,979,424 | Whitehurst et al. | Apr. 11, 1961 |

FOREIGN PATENTS

| | | |
|---|---|---|
| 661,075 | Great Britain | Nov. 14, 1951 |
| 435,246 | Italy | May 14, 1948 |

OTHER REFERENCES

The Glass Industry, vol. 26, No.3, March 1945, pp. 119, 120, 136–138, 142 and 149 (p. 136 relied on).